United States Patent [11] 3,552,676

| [72] | Inventor | Georges Robert Weber |
| | | 16 Chemin de Rojoux, Geneva, Switzerland |
| [21] | Appl. No. | 803,829 |
| [22] | Filed | Mar. 3, 1969 |
| [45] | Patented | Jan. 5, 1971 |
| [32] | Priority | Mar. 1, 1968 |
| [33] | | Switzerland |
| [31] | | No. 3100/68 |

[54] EMERGENCY LOCKING RETRACTOR FOR SAFETY BELT
4 Claims, 5 Drawing Figs.
[52] U.S. Cl. .................................................... 242/107.4
[51] Int. Cl. ........................................................ B65h 75/48
[50] Field of Search ........................................... 242/107,
107SB, 107.4, 107.5, 107.6; 297/388; 280/150SB

[56] References Cited
UNITED STATES PATENTS

| 2,708,555 | 5/1955 | Heinemann et al. | 242/107.4 |
| 3,203,641 | 8/1965 | McFarlane et al. | 242/107.4 |
| 3,226,053 | 12/1965 | Petty | 242/107.4 |
| 3,240,510 | 3/1966 | Spouge | 242/107.4X |
| 3,248,069 | 4/1966 | Nichols | 242/107.4 |
| 3,343,763 | 9/1967 | Spouge | 242/107.4 |
| 3,430,891 | 3/1969 | Burleigh | 242/107.4 |
| 3,450,368 | 6/1969 | Glauser et al. | 242/107.4 |

Primary Examiner—Stanley N. Gilreath
Assistant Examiner—Werner H. Schroeder
Attorney—Stevens, Davis, Miller & Mosher ABSTRACT: An automatic locking mechanism for the strap-winding pin is operated by a flywheel controlled by a pendulum-operated brake to lock the pin against rotation when the strap is suddenly pulled on. A balanced mass makes the mechanism insensitive to inclinations of the vehicle.

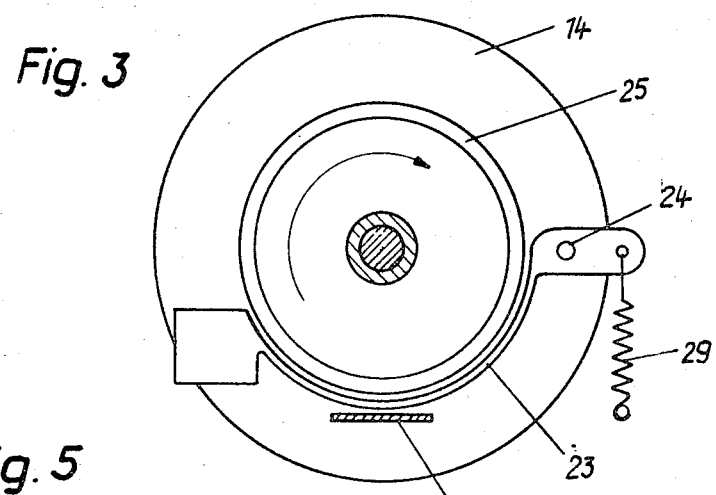
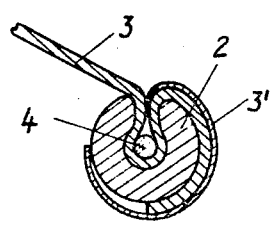
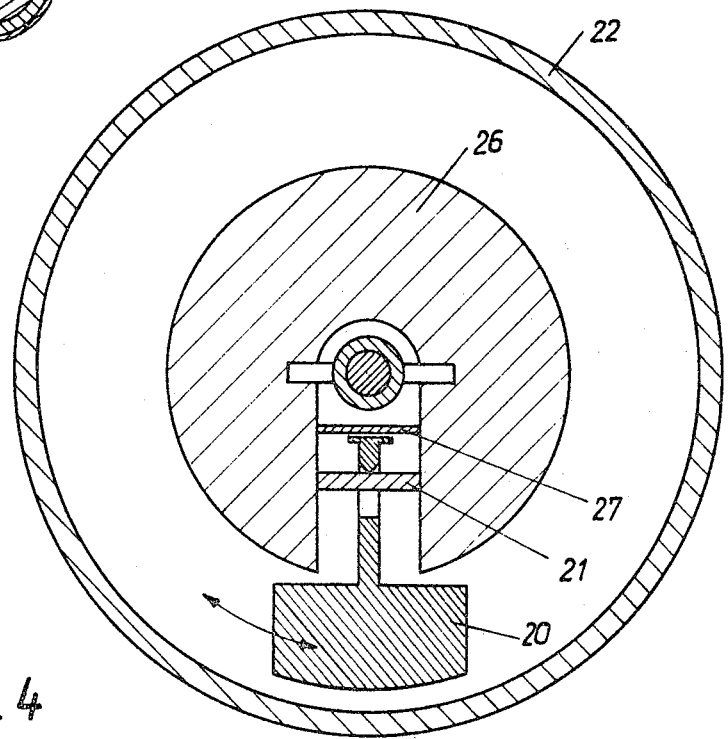

EMERGENCY LOCKING RETRACTOR FOR SAFETY BELT

BACKGROUND OF THE INVENTION

The invention relates to a safety locking retractor for safety belts in a vehicle.

The safety belts used up to now must be adjusted to the person using the vehicle in such a manner that the strap is applied against the chest of the user without play. In accordance with the experiments carried out, it has been found that a loose belt may, in case of collision, cause whiplash, the consequences of which may be serious and may in particular lead to a broken neck. By tightening the strap in order to avoid this danger the user can practically no longer budge in his seat which also constitutes a serious drawback from the standpoint of comfort.

It has already been proposed to remedy this drawback by using safety belts with retractor, that is to say with a device for storing all or part of the strap of a safety belt. There are several types of retractors but only the emergency lock retractor will be considered here. Such a retractor comprises a locking mechanism which is activated by the acceleration of the vehicle or by the displacement of the strap with respect to the vehicle and which in locked position can withstand retaining forces. Under normal conditions of use the strap does not limit the freedom of movement of the wearer.

Up to now, none of the existing retractors satisfactorily meets the test specifications and conditions stipulated by the International Standardization Organization.

SUMMARY OF THE INVENTION

The present invention provides the solution to this problem and the emergency locking retractor which is its object is characterized by a locking mechanism between the frame of the retractor and a strap-winding pin, by a flywheel for actuating the locking mechanism and by a device for the braking of the flywheel which is placed in action by the accelerating of the vehicle in at least three perpendicular directions, the flywheel being made operative on the one hand by a sudden pull of the strap and on the other hand by the braking device.

BRIEF DESCRIPTION OF THE DRAWINGS

The accompanying drawings show by way of example one embodiment of the retractor which forms the object of the present invention.

FIG. 3 is a section along the line 3–3 of FIG. 1.
FIG. 4 is a section along the line 4–4 of FIG. 1.
FIG. 5 is a section on a smaller scale along the line 5–5 of FIG. 1.

DESCRIPTION OF THE PREFERRED EMBODIMENT

Figure 1:
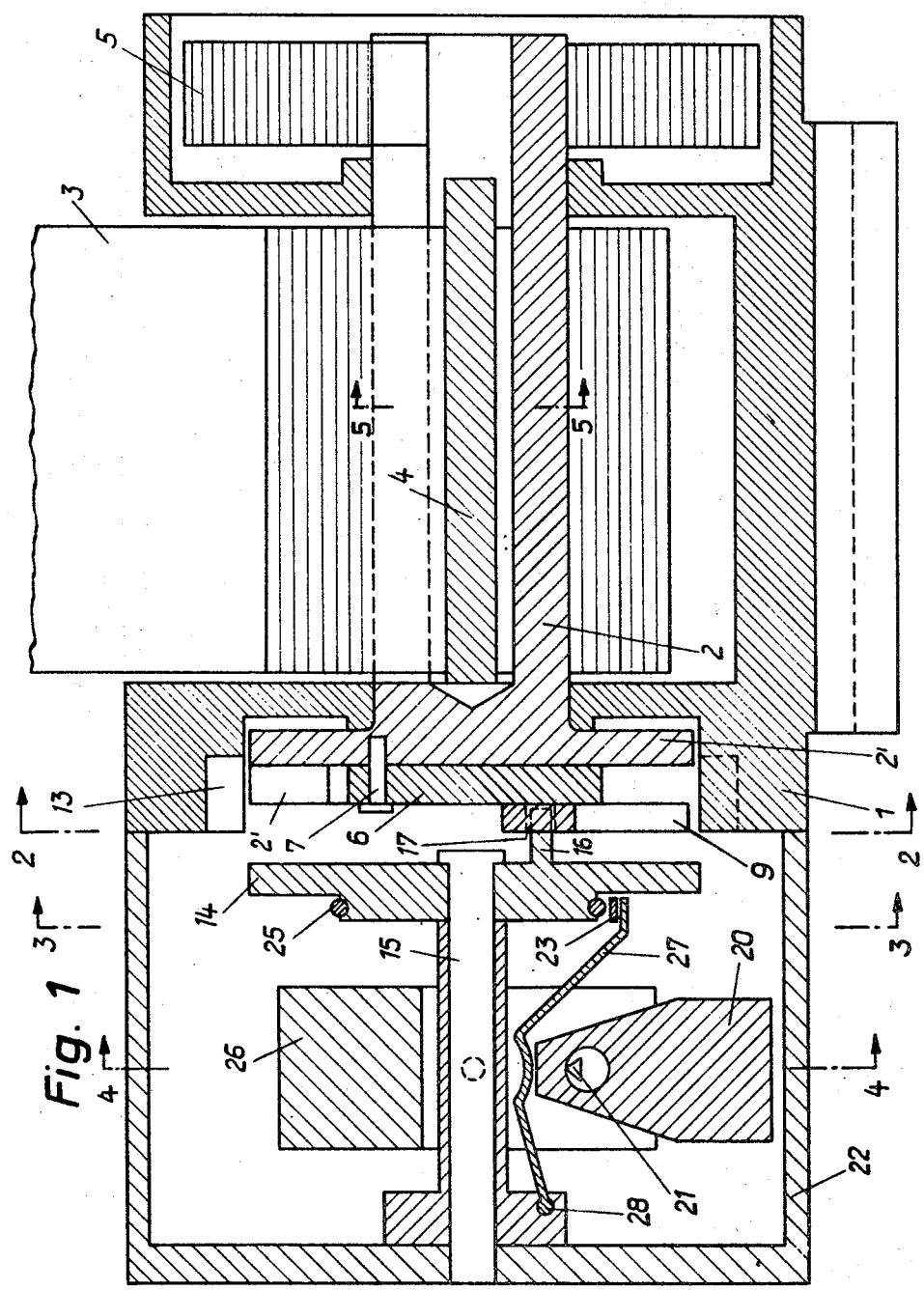
FIG. 1 is an axial section through the entire retractor.
Figure 2:
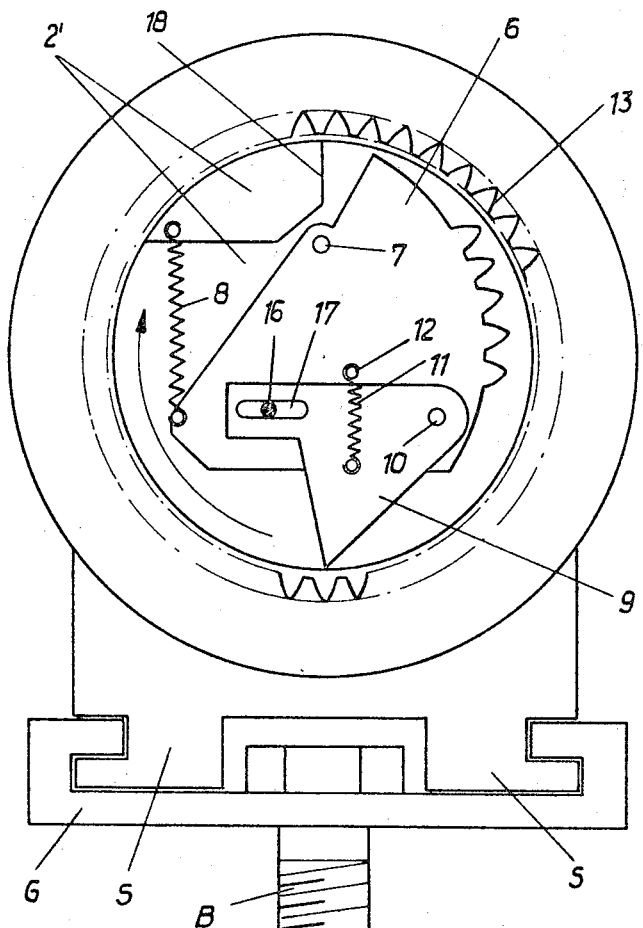
FIG. 2 is an end view on a smaller scale partially in section along the line 2–2 of FIG. 1.

The retractor shown in the drawing comprises a frame 1 in which a hollow grooved pin 2 can rotate. The strap 3 is firmly fastened to the inside of the pin 2 by means of a wedging rod 4 as shown in FIG. 5. A clip 3' applies the free end of the strap 3 against the pin 2 and permits uniform winding. A coil spring 5 assures the winding of the strap 3 around the pin 2. The frame 1 has a base S intended to be locked in a corresponding slide G fastened to the vehicle by one or more bolts B. The retractor is fastened in the vehicle in such a manner that the pin 2 is parallel to the axis of the vehicle.

The pin 2 terminates on the one side in a milled plate 2' in which a toothed sector 6 is housed. The toothed sector 6 can pivot around a pivot 7 and is held in position of rest by a return spring 8. A pawl 9 is pivotally mounted on the toothed sector 6 via a pivot 10 and is held in position of rest against a stop 12 by a return spring 11. This pawl 9 is of low inertia and is made of a plastic material such as that sold under the trademark Delrin. In unlocked condition, the plate 2' of the pin 2 which bears the toothed sector 6 and the pawl 9 can turn freely within a toothed gear rim 13 provided in the frame 1. The strap 3 can then freely wind up and unwind around the pin 2. A flywheel 14, borne by a pin 15, has a spur 16 which penetrates into hole 17 in the pawl 9. As a result of this, the flywheel 14 is forced to follow the movements of rotation of the pin 2. However, in the direction of the unwinding of the strap 3, indicated by an arrow on the plate 2', the drive torque of the flywheel 14 tends to move the pawl 9 away from its position of rest. A sudden pull upon unwinding of the strap 3 brings the pawl 9 into contact with a tooth of the rim 13. The plate 2' continuing to rotate, pawl 9 is displaced and causes the toothed sector 6 to pivot around the pivot 7. The toothed sector 6 enters progressively into engagement with the rim 13. A stop 18 on the plate 2' limits the pivoting of the toothed sector 6 when the latter is completely engaged in the rim 13. The pin 2 which bears the strap 3 is at this moment locked to the frame 1. The purpose of the pawl 9 is to assure the correct engagement of the toothed sector 6 with the rim 13 even when there is only a very slight force exerted on the spur 16.

The lock control device is of double-acting type. The first action takes place when the strap is suddenly pulled upon unwinding. As the flywheel 14 cannot immediately follow along in the rotation of the pin 2, it pivots the pawl 9 which controls the locking by pivoting the toothed sector 6 in engagement with the rim 13. The second action is brought about by the acceleration of the vehicle which bears the retractor. FIGS. 3 and 4 illustrate the principle of the device which assures this second action. A pendulum 20 can oscillate around a point 21 under the effect of lateral accelerations of the vehicle, that is to say accelerations directed perpendicular to the axis of the retractor. The upper portion of the pendulum 20 is flat and bears a rigid lever 23 which pivots around a pin 24 fixed in a housing 22 rigidly connected with the frame 1. When the pendulum 20 moves away from the vertical, it lifts the lever 23 which comes into contact with a rubber ring 25 fastened to the flywheel 14 (FIG. 1) which has the effect of braking said flywheel. The braking of the flywheel causes the locking of the retractor as described above in connection with the first action, that is to say by pivoting the pawl 9 via the spur 16. The arrangement of FIG. 1 may be made sensitive also to accelerations directed along the axis of the retractor by permitting the pendulum to oscillate also in the direction perpendicular to the plane of FIG. 3.

The prescribed values of acceleration of the vehicle for which the emergency locking retractor must lock are far less than 1 g. (1 g. = acceleration of gravity = 9.81 m/s²). These values require a high sensitivity of the device for the second action. It follows from this that even for small inclinations of the vehicle the retractor locks due to the change in static position.

FIG. 4 shows an embodiment of a mechanism which compensates for the effect of lateral and longitudinal inclination of the vehicle and has a balanced mass 26 associated with the pendulum 20 in such a manner that the inclinations of the vehicle are made inoperative on the retractor. The mass 26 is held at all times in vertical position by the pendulum 20 which is capable of oscillating in all directions around the point 21 which is fixed in the mass 26.

The forces of acceleration of the vehicle move the pendulum 21 away from the vertical position while they are practically without effect on the inert mass 26. The relative displacement of the pendulum 20 and of the mass 26 causes the raising of the lever 27 which is articulated at the point 28. The lever 27 in its turn raises the lever 23 which, by braking, brings about the locking (FIG. 3).

In addition, the retractor described is made sensitive to vertical acceleration by means of a spring 29 which compensates for part of the weight of the lever 23. A value of vertical acceleration of the vehicle less than 1 g. can thus activate the locking.

The form of the lever 23 assures the braking of the flywheel 14 only in the direction of unwinding of the strap 3. In accordance with the requirements, the rewinding of the strap 3 can always be effected since the lever 23 is pushed back by the rubber ring upon rotation in direction opposite to that indicated by the arrow.

Although the preferred embodiment of the invention has been described, the scope of, and the breadth of protection afforded to, the invention are limited solely by the appended claims.

I claim:

1. An emergency locking device for a safety belt in a vehicle, comprising a frame, a rotatable winding pin for said belt, locking means for locking said winding pin to said frame to prevent rotation of the former, a rotatably mounted flywheel for actuating said locking means, braking means operated by the change in velocity of said vehicle in any one of at least three directions for braking said flywheel, said flywheel being made operative by a sudden pull to unwind said belt or by said braking means, a toothed rim rigidly connected with said frame, and a plate rigidly connected with said winding pin; wherein said locking means comprises a toothed sector mounted on said plate free to turn within said toothed rim to mesh with the latter to lock said winding pin.

2. The device as defined in claim 1, including a pawl associated with said toothed sector for ensuring that the latter correctly meshes with said toothed rim.

3. The device as defined in claim 2, including means for pivotally connecting said pawl to said toothed sector, means for pivotally connecting said toothed sector to said plate eccentrically with respect to said toothed rim, resilient means for biasing said toothed sector and said pawl to respective rest positions, and means for positively connecting said flywheel to said pawl.

4. An emergency locking device for a safety belt in a vehicle, comprising a frame, a rotatable winding pin for said belt, locking means for locking said winding pin to said frame to prevent rotation of the former, a rotatably mounted flywheel for actuating said locking means, and braking means operated by the change in velocity of said vehicle in any one of at least three directions for braking said flywheel, said flywheel being made operative by a sudden pull to unwind said belt or by said braking means; said braking means comprising a pendulum mounted to respond to said change in velocity, a braking lever actuated by said pendulum for braking the movement of said flywheel, and a balanced mass associated with said pendulum for compensating for the effects of lateral and longitudinal inclinations of said vehicle to make said locking means unresponsive to these inclinations.